United States Patent Office 3,436,050
Patented Apr. 1, 1969

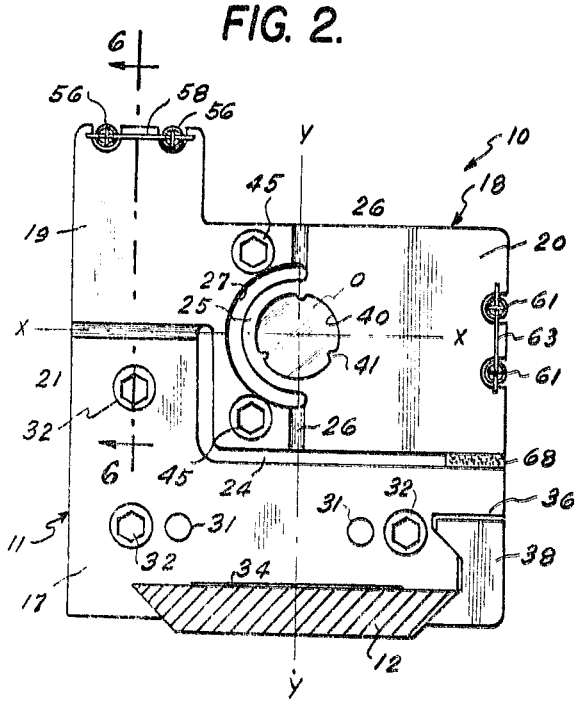
FIG. 2.
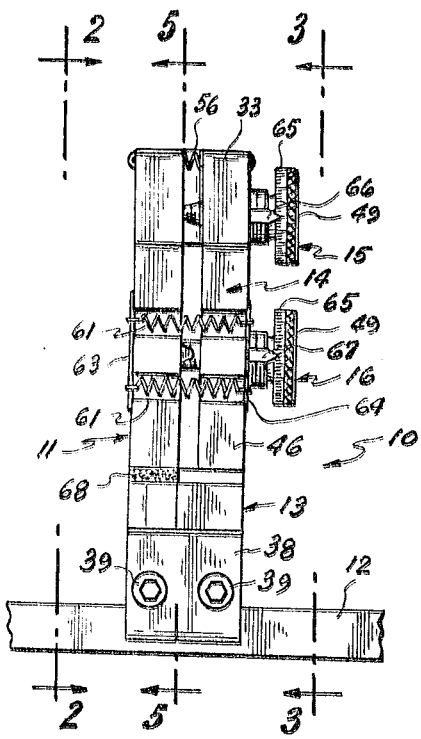
FIG. 1.
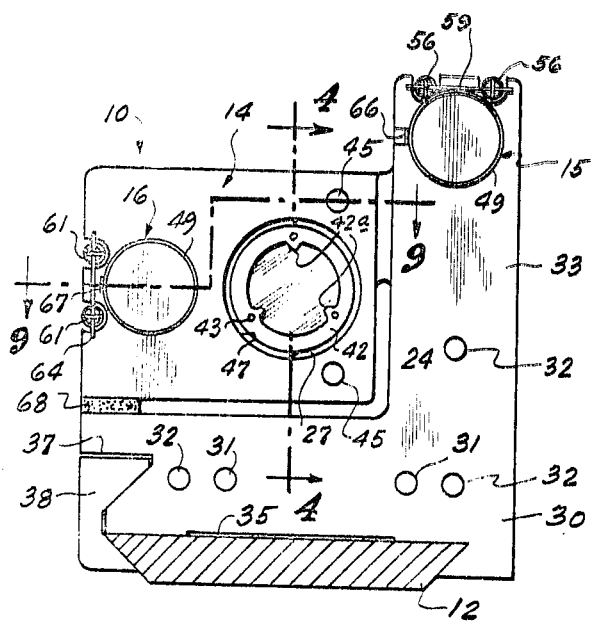
FIG. 3.
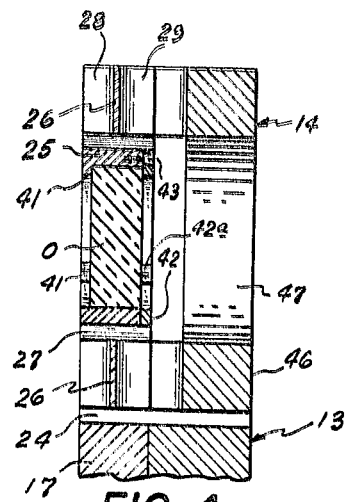
FIG. 4.
INVENTOR
EDWARD CAMP TIBBALS JR.
BY
ATTORNEY

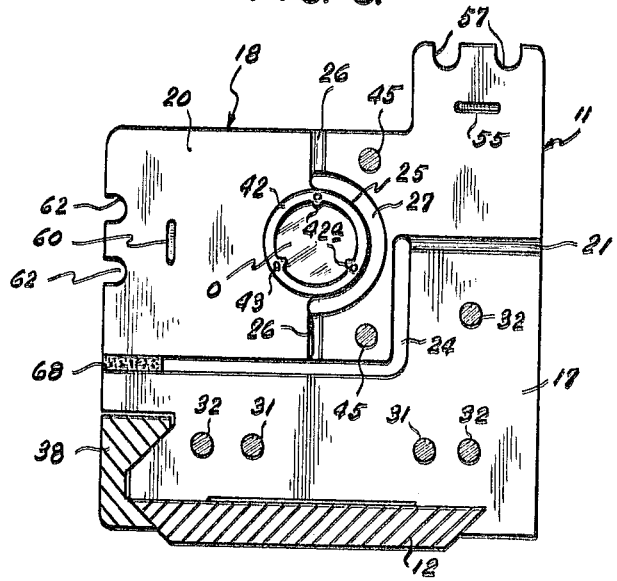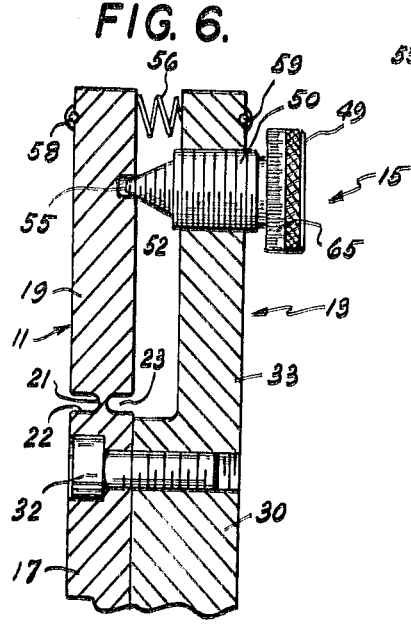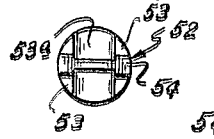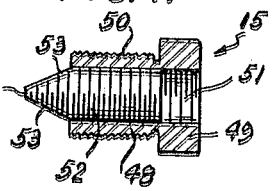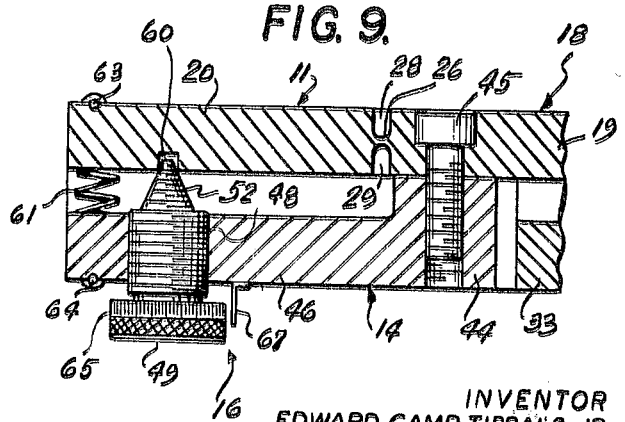

3,436,050
ADJUSTABLE MOUNT FOR OPTICAL ELEMENT
Edward Camp Tibbals, Jr., Boulder, Colo., assignor, by mesne assignments, to Alexander Dawson, Inc., Mahwah, N.J., a corporation of Delaware
Filed May 4, 1967, Ser. No. 636,095
Int. Cl. A47g 1/24
U.S. Cl. 248—487                 11 Claims

ABSTRACT OF THE DISCLOSURE

A mount for a mirror or other optical element of an optical system, for example, in an interferometer, includes a one-piece, grooved and slotted support plate constituting a base portion which may be displaceable parallel to the axis of the optical system and a section for carrying the optical element which is angularly displaceable relative to the base portion at thin webs defining orthogonally related axes intersecting at the center of such element and lying in a common plane generally perpendicular to the optical axis, and differential screws acting against the support plate for selectively causing fine, continuous angular adjustment of the element carrying section about each of those orthogonally related axes, thereby to precisely angularly position the optical element relative to the optical axis.

This invention relates generally to an adjustable mounting for an optical element, such as, a mirror of an interferometer which may, for example, form part of a laser scanning system as disclosed in the copending application for U.S. Letters Patent, Ser. No. 636,077, or of any other optical instrument in which precise angular positioning of the optical element relative to an optical axis is required.

An object of this invention is to provide a mount for an optical element which permits precisely controlled, smooth and continuous angular displacements of the mounted element about orthogonally related axes lying in a common plane and intersecting at the center of the mounted element, and which is capable of maintaining the optical element in any adjusted position and is sufficiently stable to shield the mounted element from external impacts and vibrations.

A further object is to eliminate all play in the structure by which the mounted optical element is permitted to pivot about orthogonally related axes.

Still another object is to effect adjustment of the mounted element about the orthogonally related axes by mechanisms which are free of backlash and capable of reproducibly causing minute, precisely controlled angular adjustments in any desired sense.

In accordance with an aspect of this invention, an adjustable mount for an optical element comprises a support plate having a base portion and an adjustable portion which includes first and second sections and which is joined to the base portion by a relatively thin web extending only between its first section and the base portion to permit pivoting of the adjustable portion relative to the base portion about a first axis, the second section being joined only with the first section by a relatively thin web permitting pivoting of the second section relative to the first section about a second axis which is orthogonally related to the first axis and in a common plane therewith, the optical element is mounted on the second section of the adjustable portion in centered relation to the intersection of the first and second axes, and first and second adjusting means which are free of backlash are provided to act against the first and second sections, respectively, of the adjustable portion for angularly displacing the mounted optical element about the first and second axes, whereby the optical element can have its axis angularly positioned in relation to an optical axis with respect to which the base portion is fixed.

In a preferred embodiment of the invention, the base portion and the sections of the adjustable portion of the support plate are all integral with each other, and the support plate has rectilinear grooves extending through slightly less than the thickness of the plate along the first and second axes to define the thin webs by which the relative pivoting is permitted, while avoiding any play in the pivotal connections between the mentioned portions and sections of the support plate.

It is a further feature of the invention to effect the desired angular displacements of the mounted optical element by means of differential screws which are pre-biased to be free of backlash and which provide relatively minute angular displacements of the mounted element in response to substantial rotational movements of the differential adjusting screws, thereby to permit very precise adjustments of the optical element.

The above, and other objects, features and advantages of the invention, will be apparent in the following detailed description of an illustrative embodiment thereof which is to be read in connection with the accompanying drawings, wherein:

FIG. 1 is a side elevational view of an adjustable mount for an optical element in accordance with an embodiment of this invention;

FIG. 2 is a front elevational view of the mount as viewed in the direction of the arrows 2—2 on FIG. 1;

FIG. 3 is a back elevational view of the mount as viewed in the direction of the arrows 3—3 on FIG. 1;

FIG. 4 is an enlarged, fragmentary sectional view taken along the line 4—4 on FIG. 3;

FIG. 5 is a vertical sectional view taken along the line 5—5 on FIG. 1, and showing the back surface of a support plate included in the mount;

FIG. 6 is an enlarged, fragmentary sectional view taken along the line 6—6 on FIG. 2;

FIG. 7 is an axial sectional view of a differential screw assembly included in the mount embodying this invention for effecting angular adjustments of the mounted optical element;

FIG. 8 is an end view of one of the screws of the assembly of FIG. 7; and

FIG. 9 is an enlarged, fragmentary sectional view taken along the line 9—9 on FIG. 3.

Referring to the drawings in detail, and initially to FIGS. 1, 2 and 3 thereof, it will be seen that an adjustable mount 10 for supporting an optical element in accordance with this invention generally comprises a support plate 11 mounted in upstanding position on a rigid rail 12 so as to be adjustable along the latter, support members 13 and 14 secured to plate 11 at one side of the latter, for example, in back of plate 11, as shown, and adjusting mechanisms 15 and 16 respectively carried by members 13 and 14 acting against plate 11, as hereinafter described in detail, to effect angular displacements of a mounted optical element O about orthogonally related axes X—X and Y—Y (FIG. 2) which lie in a common plane and intersect at the center of the mounted optical element.

As shown particularly on FIGS. 2 and 5, support plate 11 generally includes a base portion 17 and an adjustable portion 18 that consists of sections 19 and 20. Adjustable portion 18 is connected, preferably integrally, to base portion 17 only at its section 19 by a relatively thin web 21 (FIGS. 2, 5 and 6) extending between section 19 and portion 17 in alignment with axis X—X and preferably being equidistant from the opposite faces of plate 11.

Thin connecting web 21 between base portion 17 and section 19 is preferably provided by routing or otherwise cutting rectilinear, registering grooves 22 ant 23 in the front ant back faces of plate 11, such grooves having a combined depth slightly less than the thickness of plate 11 so as to leave the thin web 21 therebetween. In order to free adjustable portion 18 from base portion 17 except at the connecting web 21 therebetween, a slot 24 is cut through plate 11 and extends from the inner end of web 21, for example, downwardly and then laterally across to the remote side edge of plate 11, as shown.

As is particularly apparent on FIG. 2, plate section 20 has a part 25 thereof which straddles axes X—X and Y—Y adjacent the intersection thereof. Section 20 is connected only to section 19 by thin webs 26 extending along axis Y—Y, and which are preferably integral with sections 19 and 20 and centered or equidistant between the opposite faces of plate 11 (FIGS. 4 and 8). Section 20 is otherwise made free of section 19, particularly at the periphery of the part 25 of section 20 which extends across axis Y—Y, for example, by a slot 27 passing completely through plate 11 and extending around part 25 between the ends of webs 26. As in the case of thin web 21, thin webs 26 are preferably provided by routing or otherwise cutting registering rectilinear grooves 28 and 29 (FIG. 8) in the opposite faces of plate 11, with such grooves 28 and 29 having a combined depth slightly less than the thickness of the plate so as to leave the thin webs 26 therebetween.

Webs 21 and 26 are sufficiently thin, for example, such webs may have a thickness of approximately .025 inch, so that, even when plate 11 is formed of hard brass, web 21 will permit limited angular displacement of adjustable portion 18 relative to base portion 17 about axis X—X, and webs 26 will permit limited angular displacement of section 20 relative to section 19 about axis Y—Y.

As shown particularly on FIG. 3, support member 13 is generally of L-shaped configuration and includes a relatively thick base portion 30 (FIG. 6) which is substantially coextensive with base portion 17 of support plate 11, and which is rigidly secured to base portion 17, as by dowel pins 31 and machine screws 32 (FIGS. 2 and 3). Support member 13 further has an arm 33 of reduced thickness (FIG. 6) extending upwardly from its base portion 30 so as to be disposed in back of, and spaced rearwardly from section 19 of support plate 11.

In order to secure mount 10 on rail 12 and to permit adjustment of the mount along the rail when desired, base portions 17 and 30 are cut out, as at 34 and 35 (FIGS. 2 and 3), so as to slidably engage the top surface and one of the undercut side surfaces of rail 12. Further, sides of base portions 17 and 30 are notched, as at 36 and 37, respectively, to receive a wedge clamping member 38 which is releasably secured to base portions 17 and 30, as by machine screws 39 (FIG. 1). It will be apparent that, when machine screws 39 are loosened, mount 10 can be bodily displaced, as a unit, along rail 12, for example, in a direction parallel to an optical axis with respect to which the optical element O is to be angularly positioned. However, when screws 39 are tightened, the wedging action of clamp 38 on base portions 17 and 30 and on the adjacent undercut side edge of rail 12 ensures the rigid, secure fixing of both base portions to the rail.

The optical element O, for example, in the form of an optical mirror as shown, is suitably mounted in part 25 of section 20 so as to be centered with respect to the intersection of axis X—X and Y—Y. For the purpose of receiving optical element O, section 20 of support plate 11 is shown to have a circular opening 40 extending therethrough (FIG. 2) and being centered with respect to the intersection of the axes. Equally spaced apart projections or lugs 41 extend radially into opening 40 at the front face of section 20 to define ledges or seats against which optical element O can engage without being warped or distorted. The optical element may be held against projections 41 by a retaining ring 42 (FIGS. 3, 4 and 5) which is suitably secured to the back surface of section 20, as by screws 43, and which has radially inward directed lugs 42a disposed in alignment with lugs 41 to engage mirror O at three points defining a plane and thus minimizing distortion of the mirror or other optical element. Alternatively, if desired, the mirror or other optical element O may be mounted in an externally threaded metal rim (not shown), in which case the surface of opening 40 is similarly threaded to receive the rim carrying the optical element.

As shown on FIG. 3, support member 14 is generally coextensive with section 20 of support plate 11 and with that part of section 19 between the vertically directed length of slot 24 and webs 26. Further, support member 14 is shown to have a relatively thick portion 44 (FIG. 8) which is engageable with the back surface of plate 11 at that part of its section 19 over which member 14 extends, and such relatively thick portion 44 is rigidly secured to section 19, as by machine screws 45. Member 14 further has a relatively thinner arm 46 extending laterally from thick portion 44 so as to be disposed in back of, and spaced from section 20 of plate 11. Member 14 is formed with a circular opening 47 (FIGS. 3 and 4) exposing that part of section 20 in which optical element O is mounted.

As shown particularly on FIG. 6, adjusting mechanism 15 is in the form of a differential screw extending threadably through arm 33 of support member 13 and projecting forwardly from such arm to act against section 19 of plate 11 at a location spaced substantially above axis X—X defined by web 21 connecting section 19 to the rigid base portion 17. The differential screw constituting adjusting mechanism 15 is shown on FIG. 7 to include a hollow outer screw 48 having a knob 49 at its back end and being formed with external and internal threads 50 and 51, and an externally threaded inner screw 52 which is threadably telescoped in outer screw 48. The external threads 50 on screw 48, and hence the threads formed in arm 33 to receive screw 48, are of a pitch that is slightly different than the pitch of internal threads 51, and hence of the threads formed on inner screw 52. For example, external threads 50 of screw 48 may have forty-four threads per inch, while internal threads 51 have forty-five threads per inch. Thus, if inner screw 52 is held against rotation, as hereinafter described, while outer screw 48 is turned through a complete revolution, outer screw 48 will move axially relative to arm 33 through a distance equal to the pitch of external threads 50, that is, $\frac{1}{44}$ inch in the example given, while inner screw 52 will move axially relative to screw 48 in the opposite direction through a distance equal to the pitch of internal threads 51, that is, through $\frac{1}{45}$ inch in the example given, and the resulting axial displacement of the forward end of screw 52 relative to arm 33 will be the difference between the pitches of threads 50 and 51, that is, $\frac{1}{1980}$ inch.

In order to hold inner screw 52 against rotation, the forward end portion of such screw is cut with diametrically opposed beveled surfaces 53 to present a wedge-shaped forward end 54 which is engageable in a rectilinear groove 55 (FIGS. 5 and 6) cut in the back surface of section 19 and arranged parallel to web 21 defining axis X—X and spaced upwardly therefrom. The central portions of beveled surfaces 53 are preferably milled out, or otherwise recessed, as indicated at 53a on FIG. 8, and groove 55 is formed with a rectangular cross-section to present parallel sharp edges at the back surface of section 19, which sharp edges engage the beveled surfaces 53 only at the relatively small areas of the latter remaining at the opposite sides of the respective recesses 53a. Further, as shown on FIG. 6, groove 55 is of sufficient depth so that the end of screw 52 will be spaced from the bottom or inner surface of groove 55 when the sharp edges defined by the latter at the back surface of section 19 to engage beveled surfaces 53, as mentioned above.

It is also preferred to use a metal for screw 52 that is substantially harder than that of plate 11, whereby, in use, the sharp edges defined at the opening of groove 55 wear to a condition of line contact with beveled surfaces 53 of screw 52.

Section 19 of plate 11 is continuously biassed rearwardly toward arm 33 of support member 13. In the embodiment shown, such biassing of plate section 19 toward arm 33 is effected by helical tension springs 56 (FIGS. 1, 2, 3 and 6) which may be received in cut-outs 57 in the upper end edge of section 19 (FIG. 5) and in similar cut-outs in the upper end of arm 33, and which are anchored, at their opposite ends, by pins 58 and 59 which span such cut-outs and bear against the front face of plate section 19 and the back face of arm 33 (FIGS. 2, 3 and 6).

The adjusting mechanism 16 may be identical with the above described adjusting mechanism 15, and thus is shown on FIG. 9 to include an outer screw 48 having a knob 49 at its back end and extending threadably through arm 46 of support member 14, and an inner screw 52 projecting forwardly from screw 48 and having a wedge-shaped forward end engageable in a groove 60 of rectangular cross-section formed in the back surface of plate section 20 so as to be parallel to, and spaced laterally outward from axis Y—Y defined by webs 26 (FIG. 5). Plate section 20 is biassed relative to plate section 19 in the direction toward arm 46, for example, as by helical tension springs 61 which may be received in cut-outs 62 in the side edge of plate section 20 (FIG. 5) and similar cut-outs in the side or free edge of arm 46, and which are anchored, at their opposite ends, by pins 63 and 64 spanning such cut-outs and bearing against the front face of plate section 20 and the back face of arm 46.

It will be apparent that, when the knob 49 of adjusting mechanism 15 is turned, plate sections 19 and 20, which together make up adjustable portion 18 of support plate 11, are angularly displaced about axis X—X. Similarly, when knob 49 of adjusting mechanism 16 is turned, plate section 20 is angularly displaced relative to plate section 19 about the axis Y—Y.

The effect of springs 56 biassing plate section 19 toward arm 33 and of springs 61 biassing plate section 20 toward arm 46 is to ensure, first of all, that the edges defined by grooves 55 and 60 will be continuously held in contact with the bevelled surfaces 53 on screws 52 of the respective adjusting mechanisms 15 and 16, thereby to positively prevent any rotational movement of such screws 52. The security against rotational movement of screws 52 is enhanced by the recessed central portions 53a of their beveled surfaces 53 which permit contact of the edges defined by grooves 55 and 60 with the beveled surfaces only at the small areas thereof remaining at the opposite sides of such recesses. Thus, any crowning of the beveled surfaces 53 or a particle or dirt thereon, cannot result in rotational rocking of the screw 52 in the groove 55 or 60.

A further effect of the continuous biassing of plate sections 19 and 20 by the springs 56 and 61, respectively, is to continuously bias the threads of each screw 52 against the internal threads 51 of the respective screw 48 and to continuously bias the outer threads 50 of screw 48 against the respective threads formed in arm 33 or arm 46. Thus, there is continuity of interfacial contact at the matching screw threads, which are desirably lubricated with a high film strength lubricant, to effectively provide zero backlash in each of adjusting mechanisms 15 and 16 irrespective of the rotation imparted to the knob 49 thereof.

Since rotational movements of screws 52 are positively avoided and there is zero backlash with respect to the matching threads in adjusting mechanisms 15 and 16, and since there is no play in the pivotal mounting of plate sections 19 and 20 for angular displacements about axes X—X and Y—Y, it will be apparent that the rotational positions of knobs 49 of adjusting mechanisms 15 and 16 are at all times directly related to the angular positioning of the optical element O with respect to the axes X—X and Y—Y. Further, by reason of the foregoing, the rotational displacement of each knob 49 is effective to produce a precisely corresponding, although very much smaller, continuous angular displacement or adjustment of the mounted optical element about the respective axes X—X or Y—Y.

If desired, as shown on FIGS. 1, 6 and 9, the peripheral surfaces of knobs 49 may be only partly knurled and provided, on the remaining smooth portions thereof, with scales 65 which cooperate with pointers or index members 66 and 67 extending from arms 33 and 46 (FIGS. 3 and 9) to visually indicate the angular positioning of the mounted optical element about the axes X—X and Y—Y.

By reason of the engagement of the mirror or other optical element O only at the three equally spaced points defined by lugs or projections 41 and by the aligned projections 41 and by the aligned projections 42a of ring 42, the optical element is precisely located relative to plate section 20 without the possibility of warpage of the optical element by unequal pressure application thereto. Thus, the optical element can be removed from plate section 20, for example, for cleaning thereof, and thereafter replaced in section 20 without the danger of disturbing the angular adjustment of the optical element about axes X—X and Y—Y.

Since thin webs 21 and 26 which permit pivoting of the mounted optical element about axes X—X and Y—Y eliminate all of the play that is inherently present in all conventional hinge or pivot structures, and since the plate sections 19 and 20 are biassed into continuous contact with the screws 52 of the respective adjusting mechanisms 15 and 16, the mounted optical element is effectively shielded from the transmission thereto of external vibrations. However, in order to ensure that even prolonged, resonant vibrations will not be transmitted to the mounted mirror or other optical element, a damping member 68 (FIGS. 1, 2, 3 and 5) of foam rubber or other vibration damping material that is sufficiently flexible to permit controlled angular displacement of plate section 20 is preferably disposed in slot 24 at a location near the end thereof remote from web 21 and may be cemented to base portion 17 and plate section 20.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention.

What is claimed is:

1. An adjustable mount for an optical element comprising a support plate having a base portion and an adjustable portion which includes first and second sections, said adjustable portion being joined with said base portion by relatively thin web means extending between only said first section and said base portion and which prmits pivoting of said adjustable portion relative to said base portion about a first axis, said adjustable portion having relatively thin web means joining said second section only with said first section and permitting pivoting of said second section relative to said first section about a second axis which is orthogonally related to said first axis and in a common plane therewith, said second section having means for mounting an optical element thereon in centered relation to the intersection of said first and second axes, first adjusting means connected with said base portion and acting against said first section of the adjustable portion to adjustably pivot the latter as a whole about said first axis relative to the base portion, and second adjusting means connected with said first section and acting against said second section to adjustably pivot the latter about said second axis relative to said first section, whereby an optical element mounted on said second section can be angularly positioned about said axes in relation to said base portion.

2. An adjustable mount according to claim 1, in which said base portion and said sections of the adjustable portion are all integral with each other, and said support plate has rectilinear grooves extending through slightly less than the thickness of the plate along said first and second axes to define said thin web means by which relative pivoting is permitted.

3. An adjustable mount according to claim 1, which said base portion and said sections of the adjustable portion are all integral with each other, and said support plate has pairs of registering rectilinear grooves in its opposite faces which extend along said first and second axes, the grooves of each of said pairs being of equal depth and having only a relatively small thickness of said support plate therebetween which constitutes said thin web means by which relative pivoting is permitted.

4. An adjustable mount according to claim 1, in which said second section has a part thereof straddling said first and second axes adjacent the intersection thereof and carrying said means for mounting an optical element in centered relation to said intersection, said base portion and said sections of the adjustable portion are all integral with each other, said support plate has rectilinear grooves extending through slightly less than the thickness of the plate along said first and second axes to define said thin web means by which relative pivoting is permitted, said grooves have ends thereof terminating short of said part of the second section which straddles said axes, and said support plate further has slots therethrough extending from said ends of the grooves to separate said adjustable portion from said base portion and said second section from said first section except at the respective thin web means therebetween.

5. An adjustable mount according to claim 1, in which said first and second adjusting means respectively include support members rigidly connected to said base portion and to said first section, respectively, at a side of said support plate and having arms projecting across said first and second axes in spaced relation to said first section and said second section, respectively, and each of said adjusting means further includes differential screw means threadably carried by said arm of the respective support member and extending therefrom into engagement with the section of said adjustable portion against which the respective adjusting means is to act.

6. An adjustable mount according to claim 5, further comprising spring means urging each of said sections of the adjustable portion against said differential screw means of the respective adjusting means to eliminate any backlash therein.

7. An adjustable mount according to claim 5, in which said differential screw means includes a first hollow screw having outer threads engaging said arm of the respective support member and inner threads of a pitch slightly different than the pitch of said outer threads, a second screw telescoping in said first screw in engagement with said inner threads thereof and extending from said first screw into contact with the respective section of said adjustable plate portion, and means to hold said second screw against rotation with said first screw, whereby turning of said first screw effects a very fine adjustment of the extension of said second screw from said arm of the respective support member.

8. An adjustable mount according to claim 7, in which said second screw has opposed beveled surfaces defining a wedge-shaped end extending from said first screw to act against said respective section and the latter has a groove of rectangular cross-section extending parallel to its respective pivoting axis to receive said wedge-shaped end and defining edges at the opening of said groove engaging said beveled surfaces and thereby constituting said means for holding the second screw against rotation.

9. An adjustable mount according to claim 8, further comprising spring means continuously biassing each of said sections of the adjustable portion toward said arms of the respective support members, thereby to ensure continuous contact of each said section, at said edges of the groove therein, with said beveled surfaces of the respective second screw for positively preventing rotation of the latter, and further to eliminate backlash in said differential screw means.

10. An adjustable mount according to claim 9, in which each of said beveled surfaces has a central recess to permit contact of said edges of the respective groove therewith only at opposite sides of said recess.

11. An adjustable mount according to claim 1, further comprising means carrying said base portion of the support plate for adjustable movement thereof in directions substantially perpendicular to said common plane of the first and second axes.

References Cited

UNITED STATES PATENTS 2,461,190   2/1949   Wolff _____ 248—180

ROY D. FRAZIER, *Primary Examiner.*

F. DOMOTOR, *Assistant Examiner.*

U.S. Cl. X.R.

350—288; 248—183, 278